(12) United States Patent
Chen

(10) Patent No.: US 8,594,452 B2
(45) Date of Patent: Nov. 26, 2013

(54) SYSTEM AND METHOD FOR PROCESSING AN IMAGE EDGE

(75) Inventor: Tai-Hung Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 701 days.

(21) Appl. No.: 12/685,259

(22) Filed: Jan. 11, 2010

(65) Prior Publication Data

US 2011/0142351 A1 Jun. 16, 2011

(30) Foreign Application Priority Data

Dec. 15, 2009 (TW) .............................. 98142890 A

(51) Int. Cl.
*G06K 9/40* (2006.01)

(52) U.S. Cl.
USPC ........... 382/266; 248/241; 248/584; 248/625; 248/678; 358/1.9; 358/462; 382/167; 382/254

(58) Field of Classification Search
None
See application file for complete search history.

(56) References Cited

U.S. PATENT DOCUMENTS

| 5,166,810 | A * | 11/1992 | Sorimachi et al. | 358/462 |
| 5,748,796 | A * | 5/1998 | Pennino et al. | 382/254 |
| 6,480,300 | B1* | 11/2002 | Aoyama | 358/1.9 |
| 6,771,320 | B2* | 8/2004 | Choi | 348/625 |
| 2002/0039152 | A1* | 4/2002 | Choi | 348/678 |
| 2004/0096103 | A1* | 5/2004 | Gallagher et al. | 382/167 |
| 2005/0140829 | A1* | 6/2005 | Uchida et al. | 348/625 |
| 2007/0182834 | A1* | 8/2007 | Yokoyama et al. | 348/241 |
| 2008/0002061 | A1* | 1/2008 | Miyazawa | 348/584 |

FOREIGN PATENT DOCUMENTS

| CN | 101399911 A | 4/2009 | |
| JP | 09200530 A | 7/1997 | |
| JP | 2004254158 A * | 9/2004 | H04N 1/46 |

* cited by examiner

*Primary Examiner* — Tsung-Yin Tsai
(74) *Attorney, Agent, or Firm* — Rabin & Berdo, P.C.

(57) ABSTRACT

A system and method for processing an image edge includes an edge filter that processes an image input to generate edge data. An edge-smoothing filter processes the edge data to filter-out image noise and preserve the image edge, thus generating edge-smoothed data. An adder adds the edge-smoothed data to the image input, thus generating an edge-smoothed image.

20 Claims, 5 Drawing Sheets

SYSTEM AND METHOD FOR PROCESSING AN IMAGE EDGE

CROSS-REFERENCE TO RELATED APPLICATIONS

This application claims the right of priority based on Taiwan Patent Application No. 098142890, filed Dec. 15, 2009, the entire contents of which are hereby incorporated by reference.

BACKGROUND OF THE INVENTION

1. Field of the Invention

The present invention generally relates to digital image processing, and more particularly to a system and method for post-processing an image edge.

2. Description of Related Art

Digital cameras or digital camcorders are increasingly becoming indispensable to modern life. As the cost and product price are reduced to make the digital cameras or camcorders more affordable to more people, commensurately low-cost optics or electronics of the digital cameras or camcorders may incur negative effects on image preprocessing, and therefore reduce image quality. For example, an image may possess a great deal of image noise due to insufficient optical resolution, large amounts of electrical noise, or distortions made by a digital signal processor (DSP).

A need has thus arisen to propose a novel image post-processing scheme, which is capable of reducing image noise and improving image quality without raising the cost.

SUMMARY OF THE INVENTION

The embodiments of the present invention disclose a system and method for processing an image edge in order to reduce image noise, smooth the edge of an object, and increase image clarity and sharpness as perceived by human eyes, thereby improving the image quality.

According to one embodiment of the present invention, the system for processing an image edge includes an edge filter, an edge-smoothing filter, and an adder. The edge filter receives and processes an image input to generate edge data. The edge-smoothing filter processes the edge data to remove or filter-out image noise while preserving the image edge, thereby generating edge-smoothed data. The adder adds the edge-smoothed data to the image input, thereby generating an edge-smoothed image. In another embodiment, the system further includes a gain amplifier to provide a gain to the edge data or the edge-smoothed data.

DETAILED DESCRIPTION OF THE INVENTION

Figure 1A:
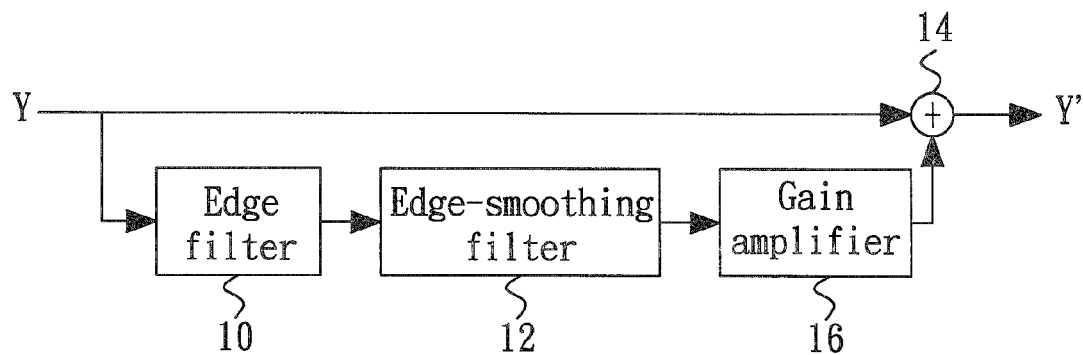
FIG. 1A is a block diagram of a system for processing an image edge according to one embodiment of the present invention.
Figure 2A:
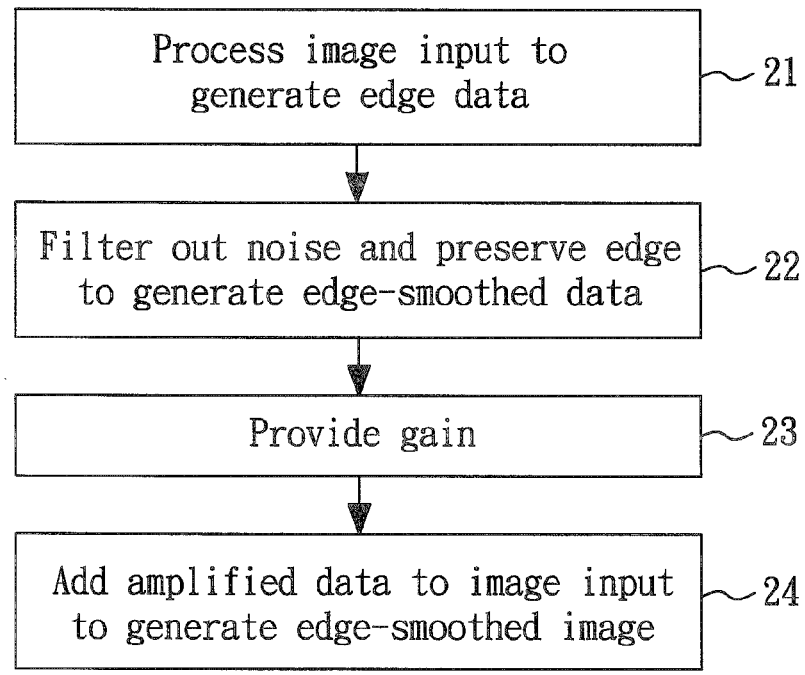
FIG. 2A is a flow diagram illustrating a method for processing the image edge according to the embodiment of FIG. 1A.

FIG. 1A is a schematic block diagram illustrating a system for processing an image edge according to one embodiment of the present invention. The image processing performed by the system is related to image post-processing, which may be adapted, but is not limited, to an imaging device (e.g., a digital camera or a digital camcorder) for smoothing image edge and reducing image noise (e.g., zigzag noise). FIG. 2A is a flow diagram elucidating a method for processing the image edge according to the embodiment of the present invention. In the embodiment, the image edge processing system primarily includes an edge filter 10, an edge-smoothing filter 12, and an adder 14.

The edge filter 10 receives and in step 21 processes an image input Y to generate edge data, which can be provided on a communication path. In the embodiment, the image input Y includes only the luminance component of an image, which luminance component is hereinafter referred to as the image input. The edge filter 10 of the present embodiment is a high-pass spatial filter that passes high-frequency components but attenuates other components. Such high-pass spatial filtering typically utilizes a high-pass filter matrix or a mask to operate on each pixel and its neighbors, with matrix coefficients as weightings.

The edge-smoothing filter 12 receives (e.g., via the communication path) and processes the generated edge data to generate edge-smoothed data in step 22. The edge-smoothing filter 12 in the embodiment has two main functions: filtering-out image noise and preserving the image edge. Compared to the conventional edge-smoothing filter (such as a low-pass filter for filtering noise), the edge-smoothing filter 12 in the embodiment not only filters-out the noise, but also preserves the edge data fed from the edge filter 10. Accordingly, the edge data may be substantially smoothed. In the embodiment, the edge-smoothing filter 12 is a band-pass filter that filters-out high-frequency components and low-frequency components, and passes the frequency band between them. In other words, the band-pass filter passes a predetermined frequency band associated with the edge data, and attenuates other frequency bands other than the edge data. In a preferred embodiment, the edge-smoothing filter 12 utilizes, but is not limited to, a bilateral filtering technique, details of which may be obtained, for example, from "Bilateral Filtering for Gray and Color Images" by C. Tomasi et al., Proceedings of 1998 IEEE International Conference on Computer Vision, Bombay, India, the disclosure of which is hereby incorporated by reference.

In the embodiment, a gain amplifier 16 may be coupled after the edge-smoothing filter 12 in order to provide a gain to the edge-smoothed data as in step 23. Finally, the adder 14 adds the amplified edge-smoothed data to the image input Y, thereby generating in step 24 an edge-smoothed image output Y'. Compared with the image input Y, the edge-smoothed image output Y' may have less image-edge noise (e.g., the edge noise due to improper imaging quality or image preprocessing), thereby smoothing the image edge, increasing image clarity and sharpness as perceived by human eyes, and improving the image quality.

Figure 1B:
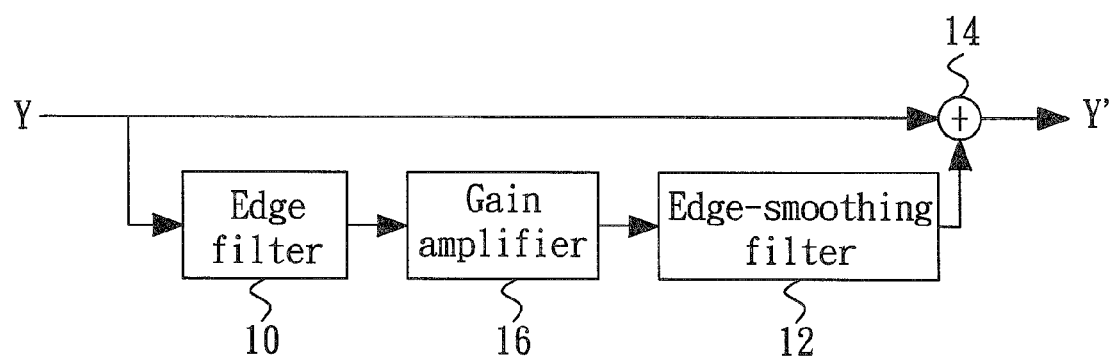
FIG. 1B is a block diagram showing a system for processing an image edge according to another embodiment of the present invention.
Figure 2B:
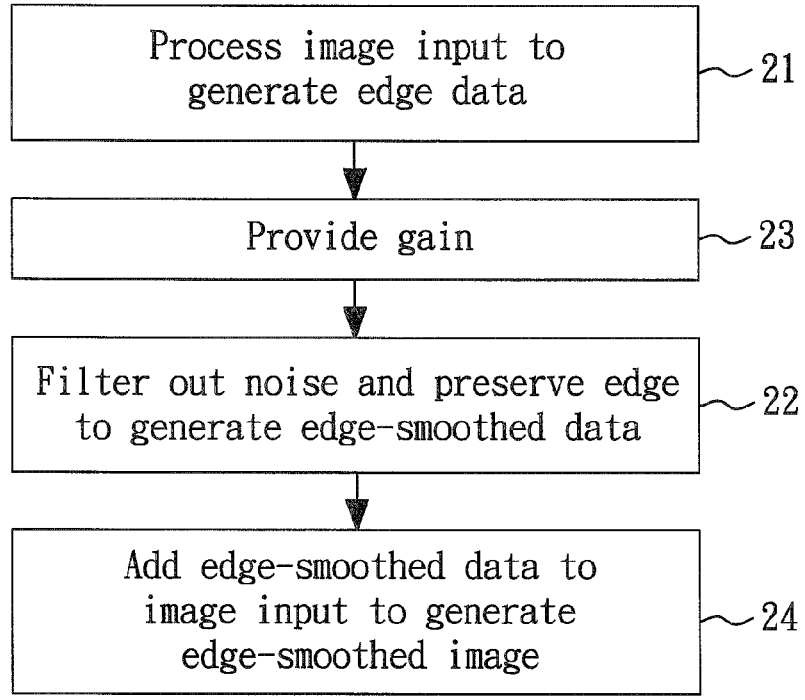
FIG. 2B is a flow diagram that illustrates a method for processing the image edge according to the embodiment of FIG. 1B.

FIG. 1B is a block diagram showing a system for processing an image edge according to another embodiment of the present invention, and FIG. 2B is a flow diagram outlining a method for processing the image edge according to the embodiment of the present invention. The present embodiment has a structure similar to that of the previous embodiment (FIG. 1A), except for the gain amplifier 16 being coupled after the edge filter 10 but before the edge-smoothing filter 12 in order to provide a gain to the edge data. Accordingly, in the embodiment, the providing of a gain in step 23 is performed ahead of the filtering-out of image noise and preserving the image edge in step 22.

Figure 1C:
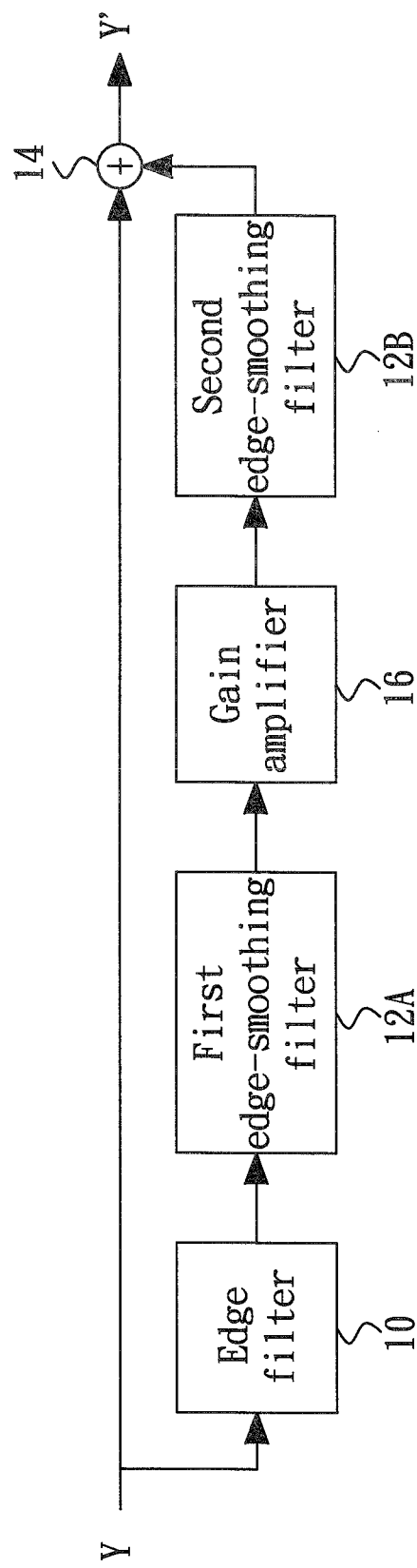
FIG. 1C is a block diagram depicting a system for processing an image edge according to a further embodiment of the present invention.
Figure 2C:
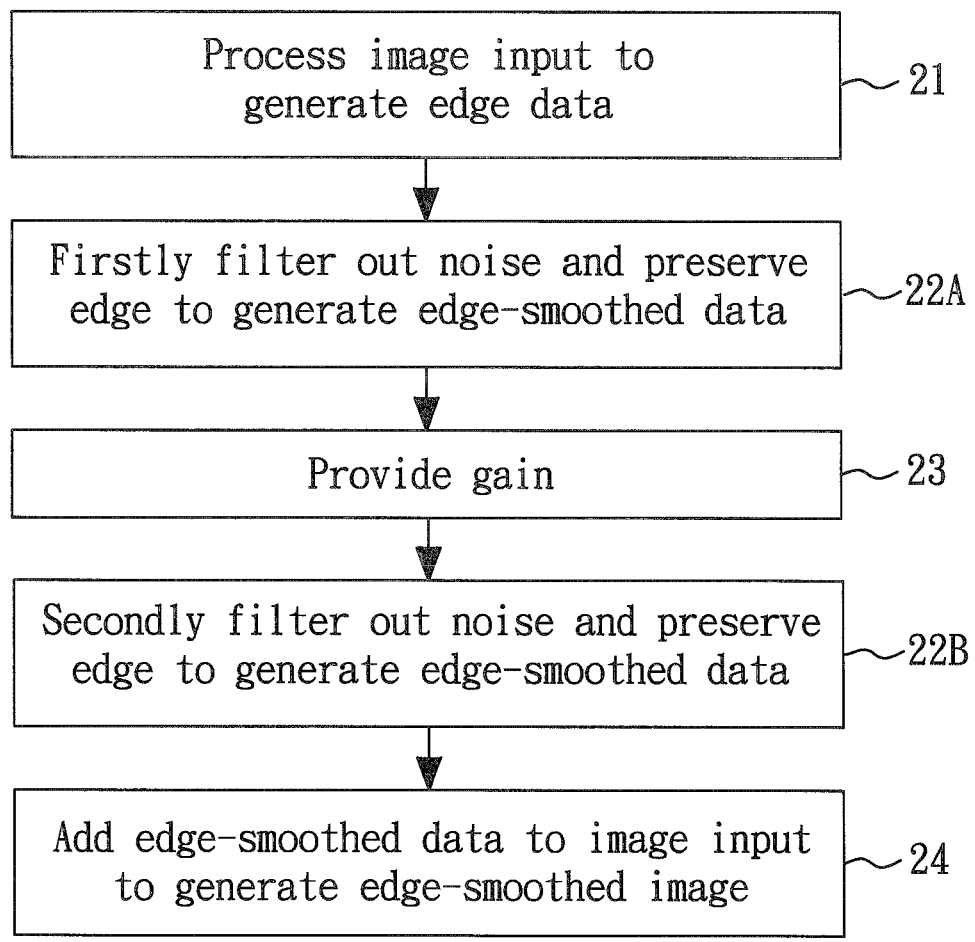
FIG. 2C is a flow diagram revealing a method for processing the image edge according to the embodiment of FIG. 1C.

FIG. 1C is a block diagram depicting a system for processing an image edge according to a further embodiment of the present invention, and FIG. 2C is a flow diagram revealing a method for processing the image edge according to the embodiment of the present invention. The present embodiment has a structure similar to that of the previous embodiment (FIG. 1A or FIG. 1B), except for the present embodiment using two edge-smoothing filters, namely, a first edge-smoothing filter 12A and a second edge-smoothing filter 12B, which are coupled ahead of the gain amplifier 16 and after the gain amplifier 16, respectively. In other words, the gain amplifier 16 is coupled between the first and second edge-smoothing filters 12A/12B in order to provide a gain to the edge-smoothed data of the first edge-smoothing filter 12A. Accordingly, in the present embodiment, firstly the filtering-out of the image noise and preserving of the image edge in step 22A is performed ahead of the providing of a gain in step 23, and secondly the filtering-out the image noise and preserving of the image edge in step 22B is performed after the providing of the gain in step 23.

According to one exemplary embodiment, the gain amplifier 16 is an adaptive gain amplifier that may provide a distinct gain value to each edge data (FIG. 1A) or each edge-smoothed data (FIG. 1B or FIG. 1C). The adaptation of the gain amplifier 16 may be implemented by a lookup table (LUT) for storing predetermined distinct gain values.

Figure 3:
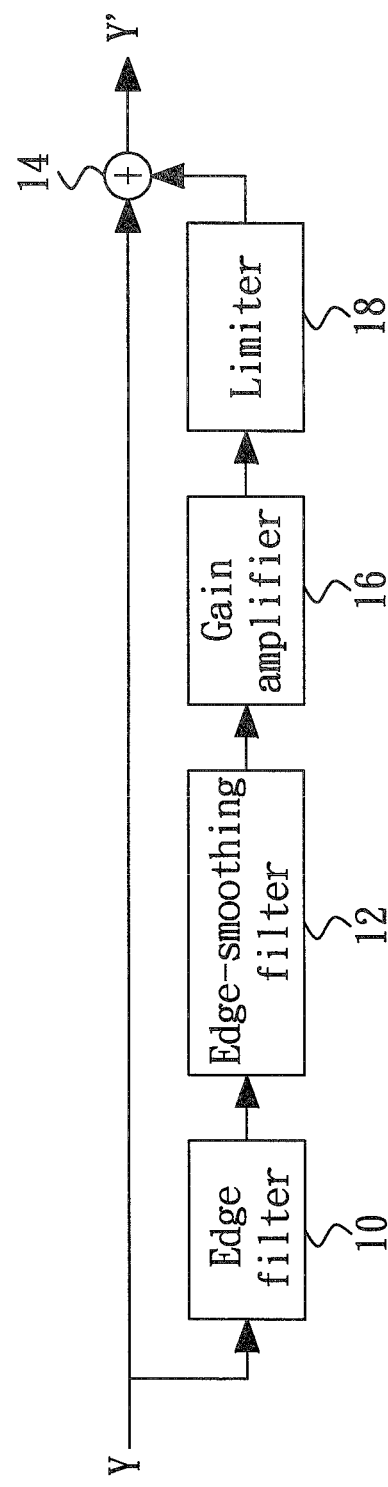
FIG. 3 is a block diagram of a system for processing an image edge according to the embodiment of FIG. 1A with an additional limiter.

According to another exemplary embodiment, the gain amplifier 16 may be followed by a limiter that is coupled after the gain amplifier 16. The limiter is used to limit the amplified value between a maximum value and a minimum value. FIG. 3 is a block diagram of a system for processing an image edge according to the embodiment of FIG. 1A with an additional limiter 18 coupled after the gain amplifier 16 in order to limit the amplified edge-smoothed data between a maximum value and a minimum value. Similarly, one or more of the embodiments of FIG. 1B and FIG. 1C may comprise a limiter coupled in a similar manner, and the corresponding block diagrams are thus omitted.

Although specific embodiments have been illustrated and described, it will be appreciated by those skilled in the art that various modifications may be made without departing from the scope of the present invention, which is intended to be limited solely by the appended claims.

What is claimed is:

1. A system for processing an object edge of an image input, comprising:
    an edge filter having a configuration to process the image input and having a communication path to provide generated edge data in accordance with the object edge of the image input;
    a first edge-smoothing filter with an arrangement to receive and process the edge data to filter-out image noise while preserving the object edge of the image input, and with an output to provide generated first edge-smoothed data;
    a gain amplifier coupled after the first edge-smoothing filter;
    a second edge-smoothing filter with an arrangement to receive and process the amplified first edge-smoothed data to filter-out image noise while preserving the object edge of the image input, and with an output to provide generated second edge-smoothed data; and
    an adder coupled to receive and configured to add the second edge-smoothed data to the image input, thereby generating an edge-smoothed image;
    wherein the edge filter, the first edge-smoothing filter, the gain amplifier and the second edge-smoothing filter are electrically connected in series.

2. The system of claim 1, wherein the edge filter is a high-pass filter.

3. The system of claim 2, wherein the first or second edge-smoothing filter is a band-pass filter.

4. The system of claim 3, wherein the band-pass filter is a bilateral filter.

5. The system of claim 1, wherein the gain amplifier provides distinct gain value to each said first edge-smoothed data.

6. The system of claim 5, wherein the gain amplifier comprises a lookup table (LUT) for storing the distinct gain values.

7. The system of claim 1, further comprising a limiter for limiting the amplified edge data or the amplified first or second edge-smoothed data between a maximum value and a minimum value.

8. The system of claim 1, wherein the image input comprises only the luminance component of an image.

9. A method for processing an object edge of an image comprising:
    processing the image input to generate edge data in accordance with the object edge of the image input;
    first processing the edge data to filter-out image noise and preserve the object edge of the image input the image edge, thereby generating first edge-smoothed data;
    second processing the first edge-smoothed data to filter-out image noise and preserve the object edge of the image input the image edge, thereby generating second edge-smoothed data; and adding the second edge-smoothed data to the image input, thereby generating an edge-smoothed image;
    wherein the edge filter, the first edge-smoothing filter, the gain amplifier and the second edge-smoothing filter are electrically connected in series.

10. The method of claim 9, wherein the step of generating the edge data comprises:
    passing high-frequency components of the image input and attenuating low-frequency components of the image input by high-pass filtering.

11. The method of claim 10, wherein the step of generating the first or second edge-smoothed data comprises:
    passing a predetermined frequency band associated with the edge data, and attenuating other frequency bands other than the edge data by band-pass filtering.

12. The method of claim 11, wherein the band-pass filtering is bilateral filtering.

13. The method of claim 9, after the step of generating the edge data or after the step of generating the first or second edge-smoothed data, further comprising a step of:
    providing a gain to the edge data or the first or second edge-smoothed data.

14. The method of claim 13, wherein the step of providing the gain comprises:
   providing a distinct gain value to each said edge data or each said first or second edge-smoothed data.

15. The method of claim 14, wherein the step of providing the gain further comprises:
   constructing a lookup table (LUT) for storing the distinct gain values.

16. The method of claim 13, further comprising a step of:
   limiting the amplified edge data or the amplified first or second edge-smoothed data between a maximum value and a minimum value.

17. The method of claim 9, wherein the image input comprises only the luminance component of an image.

18. A system for processing an object edge of an image input, comprising:
   an edge filter having a configuration to process the image input and having a communication path to provide generated edge data in accordance with the object edge of the image input;
   an edge-smoothing filter with an arrangement to receive and process the edge data while preserving the object edge of the image input, and to generate edge-smoothed data;
   a gain amplifier coupled after the edge filter or after the edge-smoothing filter; and
   an adder coupled to receive and configured to sum the image input and the edge-smoothed data from the edge-smoothing filter or the gain amplifier;
   wherein the edge filter, the edge-smoothing filter and the gain amplifier are electrically connected in series.

19. The system of claim 18, wherein the edge filter is a high-pass filter.

20. The system of claim 18, wherein the edge-smoothing filter is a band-pass filter.

* * * * *